United States Patent
Poluri et al.

(10) Patent No.: US 11,526,976 B2
(45) Date of Patent: Dec. 13, 2022

(54) USING AUGMENTED REALITY TO ASSIST IN DEVICE INSTALLATION

(71) Applicant: Honeywell International Inc., Morris Plains, NJ (US)

(72) Inventors: Nagasree Poluri, Bangalore (IN); Seema P, Bokaro Steel (IN); Uma Mageswari Shanmugam, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 276 days.

(21) Appl. No.: 16/788,119

(22) Filed: Feb. 11, 2020

(65) Prior Publication Data
US 2021/0248732 A1 Aug. 12, 2021

(51) Int. Cl.
*G06T 7/00* (2017.01)
*G06N 20/00* (2019.01)
*G09B 19/00* (2006.01)

(52) U.S. Cl.
CPC ........... *G06T 7/0004* (2013.01); *G06N 20/00* (2019.01); *G09B 19/0069* (2013.01); *G06T 2207/30108* (2013.01)

(58) Field of Classification Search
CPC .......... G06F 3/14; G06F 3/1454; G06F 3/147; G06N 20/00; G06T 19/006; G06T 2207/30108; G06T 7/0004; G09B 19/0069; H04L 67/10; H04L 67/12; H04L 67/18; H04L 67/38; G09G 2340/0492; G09G 2340/12
See application file for complete search history.

(56) References Cited

U.S. PATENT DOCUMENTS

| 7,082,464 B2 | 7/2006 | Hasan et al. |
| 7,096,164 B1 | 8/2006 | Musharbash |
| 7,308,323 B2 | 12/2007 | Kruk et al. |
| 7,334,216 B2 | 2/2008 | Molina-Moreno et al. |

(Continued)

FOREIGN PATENT DOCUMENTS

| CN | 110140096 A | 8/2019 |
| WO | 20170192752 A1 | 11/2017 |
| WO | 2019241772 A1 | 12/2019 |

OTHER PUBLICATIONS

European Search Report, EP Application No. 21153876.4, dated Jun. 25, 2021 (10 pages).

(Continued)

*Primary Examiner* — Bobbak Safaipour
(74) *Attorney, Agent, or Firm* — Seager, Tufte & Wickhem, LLP

(57) ABSTRACT

A first image of an electronic device is captured and processed in order to identify the electronic device. After identifying the electronic device, information is downloaded to a mobile device including specific wiring instructions for connecting the electronic device, which are superimposed onto an image of the electronic device to guide a user of the mobile device in wiring the electronic device. A second image of an at least partially wired electronic device may be captured and processed to ascertain whether there are any wiring errors. When wiring errors are found by the remote server, the mobile device receives a message from the remote server indicating the wiring errors that were found.

19 Claims, 13 Drawing Sheets

(56) References Cited

U.S. PATENT DOCUMENTS

| | | | |
|---|---|---|---|
| 7,567,844 | B2 | 7/2009 | Thomas et al. |
| 8,521,708 | B2 | 8/2013 | Ahmed et al. |
| 8,830,267 | B2 | 9/2014 | Brackney |
| 8,903,430 | B2 * | 12/2014 | Sands ............... H04M 1/72427 455/457 |
| 8,930,214 | B2 | 1/2015 | Woolford |
| 9,294,468 | B1 | 3/2016 | Kilbourn |
| 9,323,055 | B2 | 4/2016 | Baillot |
| 9,342,928 | B2 | 5/2016 | Rasane et al. |
| 9,571,986 | B2 | 2/2017 | Gottschalk et al. |
| 9,769,151 | B2 | 9/2017 | Klieman et al. |
| 10,278,048 | B2 | 4/2019 | Sharma et al. |
| 10,458,669 | B2 * | 10/2019 | Ribbich ................... F24F 11/89 |
| 2003/0078798 | A1 | 4/2003 | Zaks et al. |
| 2003/0177205 | A1 | 9/2003 | Liang et al. |
| 2004/0250236 | A1 | 12/2004 | O'Malley et al. |
| 2006/0044307 | A1 | 3/2006 | Song |
| 2006/0055704 | A1 | 3/2006 | Kruk et al. |
| 2006/0058900 | A1 | 3/2006 | Johanson et al. |
| 2006/0058923 | A1 | 3/2006 | Kruk et al. |
| 2006/0112073 | A1 | 5/2006 | Jensen et al. |
| 2011/0115816 | A1 | 5/2011 | Brackney |
| 2013/0031202 | A1 | 1/2013 | Mick et al. |
| 2013/0069985 | A1 | 3/2013 | Wong et al. |
| 2013/0169681 | A1 | 7/2013 | Rasane et al. |
| 2013/0212453 | A1 | 8/2013 | Gudai et al. |
| 2014/0282257 | A1 | 9/2014 | Nixon et al. |
| 2015/0062164 | A1 | 3/2015 | Kobayashi et al. |
| 2015/0097706 | A1 | 4/2015 | Perger et al. |
| 2015/0120000 | A1 | 4/2015 | Coffey et al. |
| 2015/0222604 | A1 | 8/2015 | Ylonen |
| 2015/0310664 | A1 | 10/2015 | Boussard et al. |
| 2015/0341390 | A1 | 11/2015 | Kiefer et al. |
| 2016/0019212 | A1 | 1/2016 | Soldani |
| 2016/0042568 | A1 | 2/2016 | Farnham et al. |
| 2016/0095188 | A1 | 3/2016 | Verberkt et al. |
| 2016/0313902 | A1 | 10/2016 | Hill et al. |
| 2016/0377306 | A1 * | 12/2016 | Drees ..................... F24F 11/47 700/295 |
| 2017/0018120 | A1 | 1/2017 | Li et al. |
| 2017/0005344 | A1 | 2/2017 | Nadumane et al. |
| 2017/0053441 | A1 | 2/2017 | Nadumane et al. |
| 2017/0091607 | A1 | 3/2017 | Emeis et al. |
| 2017/0021339 | A1 | 7/2017 | Ramachandran et al. |
| 2017/0213390 | A1 | 7/2017 | Ramachandran et al. |
| 2018/0012173 | A1 | 1/2018 | Leen et al. |
| 2018/0129276 | A1 | 5/2018 | Nguyen et al. |
| 2018/0157321 | A1 | 6/2018 | Liu |
| 2018/0218538 | A1 | 8/2018 | Short et al. |
| 2018/0218540 | A1 | 8/2018 | Sridharan et al. |
| 2018/0262349 | A1 | 9/2018 | Ranjan et al. |
| 2019/0186779 | A1 | 6/2019 | Janakiraman et al. |
| 2019/0268472 | A1 * | 8/2019 | Amir ....................... G06F 3/048 |
| 2019/0355177 | A1 | 11/2019 | Manickam et al. |
| 2020/0041154 | A1 * | 2/2020 | Ribbich .................. F24F 11/89 |

OTHER PUBLICATIONS

Amazon Web Services, Inc., "AWS Certificate Manager FAQ's," 15 pages, 2016.
Amazon Web Services, Inc., "AWS Certificate Manager," Downloadable at https://aws.amazon.com/certificate-manager/, 6 pages, 2016.
https://www.ibm.com/support/knowledgecenter/SSLTBW_2.1.0/com.ibm.zos.v2r1.icha700/toc.htm, "Summary of Steps for Defining a RACF Group," z/OS Security Adminstrator's Guide, 2 pages, 2014.
Schneider Electric, "User Assistance for StruxureWare Data Center Expert (DCE)7.2.2," 3 pages, 2014.
Sun Microsystems, Inc., "iPlanet Certificate Management System Installation and Setup Guide," Chapter 1, 30 pages, Oct. 7, 2002.
Tridium, "Open Integrated Solutions, Automation with the Niagara Framework," 16 pages, 2013.
U.S. Appl. No. 15/980,520, "Building System Maintenance Using mixed Reality", filed May 15, 2018.
Lee, et al., "The Virtual-Augmented-Reality Environment for Building Commission: Case Study", Proceedings of the Fifth International Conferene for Enhanced Builidng Operations, Pittsburgh, Pennsylvania, Oct. 2005, 6 pages.
Akin, et al., "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.
Lee, et al., "The Development of an Augmented Reality-Based Data Visualization System for Commissioning of Air Handling Units", 7th International Conference on Construction Applications of Virtual Reality, Oct. 2007, 10 pages.
Lee, et al., "The Development of an Augmented Reality-Based User Interface to Support Maintenance Fieldwork", Embodying Virtual Architecture: The Third International Conference of the Arab Society for Computer Aided Architectural Design (ASCAAD 2007), Nov. 2007, 8 pages.
Hakkarainen, et al., "Mobile Augmented Reality for Building and Construction", International AR Standards Workshop, Oct. 2010, 3 pages.
PCT/US2018/065970 Search Report and Written Opinion, pp. 13, dated Mar. 22, 2019.
Fiorentino, et al. "Augmented reality on large screen for interactive maintenance instructions", Computers in Industry, 2014, 18 pages.
Busker, "Task Specific Information Visualizations Using Head-Mounted Display Technology", http://essay.utwente.nl/69492/1/Busker,%20B.%200166944%20_%20openbaar.pdf, Apr. 2016, 31 pages. [Secured Download Only].
Gürsel, "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.

\* cited by examiner

USING AUGMENTED REALITY TO ASSIST IN DEVICE INSTALLATION

TECHNICAL FIELD

The present disclosure relates generally to installing and wiring devices within a building management system. More particularly, the present disclosure relates to methods and systems for using augmented reality to assist an installer in installing and wiring devices within a building management system.

BACKGROUND

A building management system (BMS) can include a large number of individually wired components that together provide functionality such as a heating, ventilating and air conditioning (HVAC) system, a lighting system, a security system, and others. It will be appreciated that having a large number of individually wired components presents a number of opportunities to make wiring errors, or even to install the wrong component at a particular location, connected to a particular set of wires. Thus, there is a need for an improved way of wiring components within a building management system.

SUMMARY

The present disclosure relates generally to methods and systems that provide an improved way of wiring components within a building management system. In one example, a mobile device may be used to assist in installing and connecting an electronic device that is mountable to a structure and includes one or more wiring terminals that are connectable to one or more different wires. The illustrative method includes capturing a first image of the electronic device using the mobile device and communicating the captured first image to a remote server so that the remote server can process the captured first image in order to determine an identity of the electronic device. After determining the identity of the electronic device, information is downloaded to the mobile device including specific wiring instructions for connecting the electronic device. The specific wiring instructions may be superimposed onto a currently displayed live-image of the electronic device as displayed on a display of the mobile device to guide a user of the mobile device in wiring the electronic device. After the electronic device has been at least partially wired, a second image of the at least partially wired electronic device may be captured using the mobile device and may communicated the second captured image of the wired electronic device to the remote server so that the remote server can process the second captured image to ascertain whether there are any wiring errors. When wiring errors are found by the remote server, the mobile device receives a message from the remote server indicating the wiring errors that were found.

In another example, a non-transient, computer-readable medium may have stored thereon executable instructions for instructing a user how to wire an electronic device. The executable instructions when executed by one or more processors of a server may cause the server to receive a first image of an electronic device captured by a mobile device and to process the received first image in order to ascertain an identity of the electronic device. Information is downloaded to the mobile device that includes specific wiring instructions for wiring the electronic device. The mobile device may superimpose the specific wiring instructions onto a live-image of the electronic device captured by the mobile device. A second image of the electronic device may be received by the server after wiring and the server may process the received second image to ascertain whether there are any wiring errors. When wiring errors are found, the server sends a message to the mobile device that informs the user that wiring errors were found.

In another example, a mobile device may be used to assist an installer in installing and connecting an electronic device in a Building Management System (BMS). The electronic device may include one or more wiring terminals connectable to one or more different wires. Wiring instructions are superimposed onto a currently displayed live-image of the electronic device on a display of the mobile device to instruct a user of the mobile device how to wire the electronic device in accordance with a BMS specification. After the electronic device has been at least partially wired by the user, an image of the at least partially wired electronic device may be captured using the mobile device. The captured image of the wired electronic device may be processed to ascertain whether there are any wiring errors. When wiring errors are found, the mobile device indicates the wiring errors that were found on the display of the mobile device along with instructions instructing the user how to correct the wiring errors.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
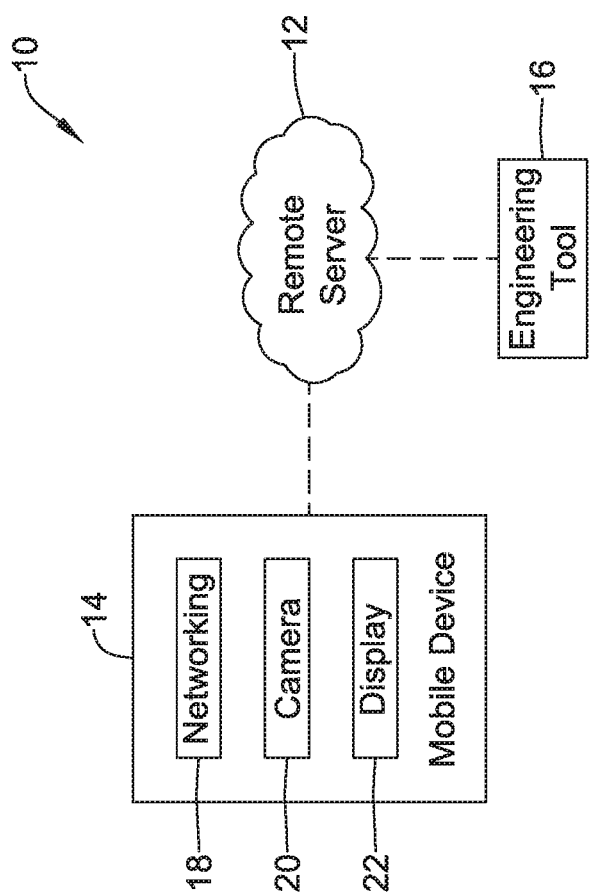
FIG. 1 is a schematic block diagram of an illustrative system usable to guide a user in installing and connecting an electronic device that includes one or more wiring terminals that are connectable to one or more different wires.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative system 10 that may be used to assist a user in installing and wiring any of a number of different electronic devices within a Building Management System (BMS). These electronic devices may, for example, include controllers, actuators, sensors and the like. It will be appreciated that a BMS may include tens, hundreds or even thousands of electronic devices such as these, and each of the electronic devices must be installed in the appropriate location and must be correctly wired. In some cases, there are calibration or setting parameters that need to be properly set on at least some of the electronic devices for the BMS to function properly. It will be appreciated that the information needed to describe and explain how each of these electronic devices are to be installed and wired represents a substantial amount of information. Accordingly, the system 10 includes a remote server 12. The system 10 also includes a mobile device 14 and an engineering tool 16.

While the remote server 12 is illustrated as a single server, and is illustrated as being a cloud-based server, this is not required in all cases. For example, the remote server 12 may be a single computer server, or a group of computer servers. The remote server 12 may be located remote from a building that houses the BMS, or the remote server 12 may be remote from the engineering tool 16 but may still be located within the aforementioned building that houses the BMS. In some cases, the remote server 12 and the engineering tool 16 may be co-located. The information describing how each of the electronic devices within a BMS are to be connected and wired may be entered into the engineering tool 16 as part of designing the BMS. The engineering tool 16 may upload this information to the remote server 12 such that the mobile device 14 may receive the information needed for a user to install and wire at least some of the electronic devices of the BMS in the building.

The mobile device 14 may be a portable device such as a laptop computer, a tablet and/or a virtual reality headset. The mobile device 14 may in some cases be a smartphone, sometimes with virtual reality capabilities. In any event, the mobile device 14 has communication capabilities including networking block 18 (such as Bluetooth, WiFi or Cellular) so that the mobile device 14 is able to communicate with the remote server 12 via the networking block 18. The mobile device 14 also has a display 22 and a camera 20, each of which will be used in guiding a user in installing and wiring any of a number of different electronic devices of the BMS. The camera 20, for example, may be used by the user to take a picture of a particular electronic device and upload the picture to the remote server 12 so that the remote server 12 can correctly identify the particular electronic device (e.g. from the many other electronic devices of the BMS). In some cases, the particular electronic device may include a sticker or other label that provides a QR code or other code that the remote server 12 can easily identify. The display 22 may be used to display an image of the particular electronic device (or a portion thereof) along with calibration, connection and/or wiring information that is provided by the remote server 12 and may be superimposed on the image of the particular electronic device (or a portion thereof). The superimposed information may include text identifying a particular terminal, a description or a picture of the appropriately colored wire that should be connected to a particular terminal, a setting for a particular switch or parameter, and the like.

The engineering tool 16 may be used by a technician to enter and/or otherwise provide all of the information necessary to spec out the BMS. This may include all of the wiring that extends between the tens, hundreds or even thousands of distinct electronic devices within the BMS. This information may also include information describing how each of the electronic devices are to be connected, wired and configured. Additional details regarding an illustrative engineering tool 16 may be found, for example, in co-pending patent application entitled Managing Certificates in a Building Management System filed on the even date herewith under Attorney Docket No. 1456.1380101; HVAC System Configuration with Automatic Parameter Generation filed on the even date herewith under Attorney Docket No.

1456.1387101; and HVAC System Configuration with Automatic Schematics and Graphics Generation filed on the even date herewith under Attorney Docket No. 1456.1389101. Each of these patent applications are incorporated by reference herein in their entireties.

Figure 2:
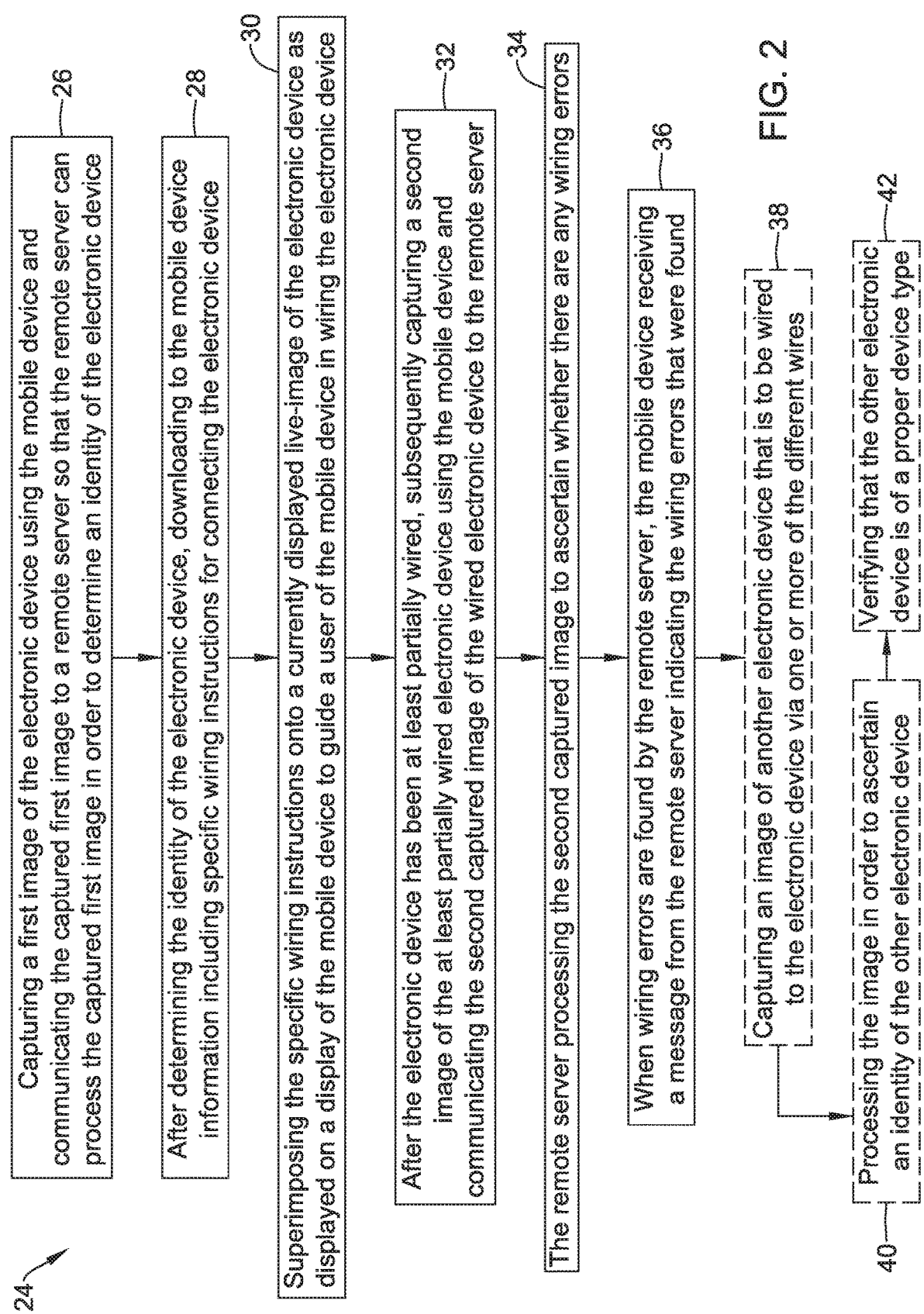
FIG. 2 is a flow diagram showing an illustrative method that may be carried out using the illustrative system of FIG. 1.

FIG. 2 is a flow diagram showing an illustrative method 24 of using a mobile device (such as the mobile device 14) to assist in installing and connecting an electronic device of a BMS, the electronic device mountable to a structure and including one or more wiring terminals connectable to one or more different wires. In some cases, the electronic device may be a particular building controller of a BMS. The illustrative method 24 includes capturing a first image of the electronic device using the camera 20 20 of the mobile device 14 and communicating the captured first image to a remote server (such as the remote server 12) so that the remote server 12 can process the captured first image in order to determine an identity of the electronic device, as indicated at block 26. In some cases, the first image may be a still image or a video stream. Identifying the electronic device may be as simple as reading a bar code, a QR code or other identifiable code such as an alphanumeric identifier provided on a sticker or label on the electronic device. After the remote server 12 determines the identity of the electronic device, the remote server 12 downloads to the mobile device 14 information that includes specific wiring instructions for connecting the particular electronic device, as indicated at block 28. In some instances, the remote server 12 may be configured to use machine learning to identify common wiring errors, and the specific wiring instructions provide to the mobile device 14 by the remote server 12 may include proactive guidance to avoid the identified common wiring errors.

The mobile device 14 may superimpose the specific wiring instructions onto a currently displayed live-image (e.g. live still image or live video stream) of the electronic device as displayed on the display 22 of the mobile device 14 to guide a user of the mobile device in wiring the electronic device, as indicated at block 30. The currently displayed live-image of the electronic device may be the captured first image of the electronic device. In some instances, the currently displayed live-image of the electronic device may instead be a live image of the electronic device as currently being captured by the camera 20 of the mobile device 14, sometimes displayed in a virtual reality mode on the mobile device 14.

After the electronic device has been at least partially wired, which may include only a single wire having been connected, a second image of the at least partially wired electronic device may be subsequently captured using the camera 20 of the mobile device 14 and may be communicated to the remote server 12, as indicated at block 32. In some cases, the second image may be captured after the electronic device has been completely wired. The remote server 12 processes the second captured image to ascertain whether there are any wiring errors, as indicated at block 34. When wiring errors are found by the remote server 12, the mobile device 14 receives a message from the remote server 12 indicating the wiring errors that were found, as indicated at block 36. In some cases, the mobile device 14 may also receive from the remote server 12 information indicating how to correct the wiring errors. If there are no wiring errors found, the mobile device 14 may receive a message from the remote server 12 indicating that the electronic device is properly wired with no wiring errors. That way, the installer knows that the particular device is properly wired in accordance with the BMS specification and the installer can move on to the next electronic device.

In some instances, as optionally indicated at block 38, an image of another electronic device that is to be wired to the electronic device via one or more of the different wires may be captured. The image may be transmitted to the remote server 12 so that the remote serer 12 can process the image in order to identify the other electronic device, as indicated at block 40. The remote server 12 can thus verify that the other electronic device is of a proper device type, as indicated at block 42, and should be connected to the electronic device. In some cases, the remote server 12 may download installation instructions for the other electronic device to the mobile device 14 such that the mobile device 14 can superimpose the installation instructions on an image of the other electronic device.

Figure 3:
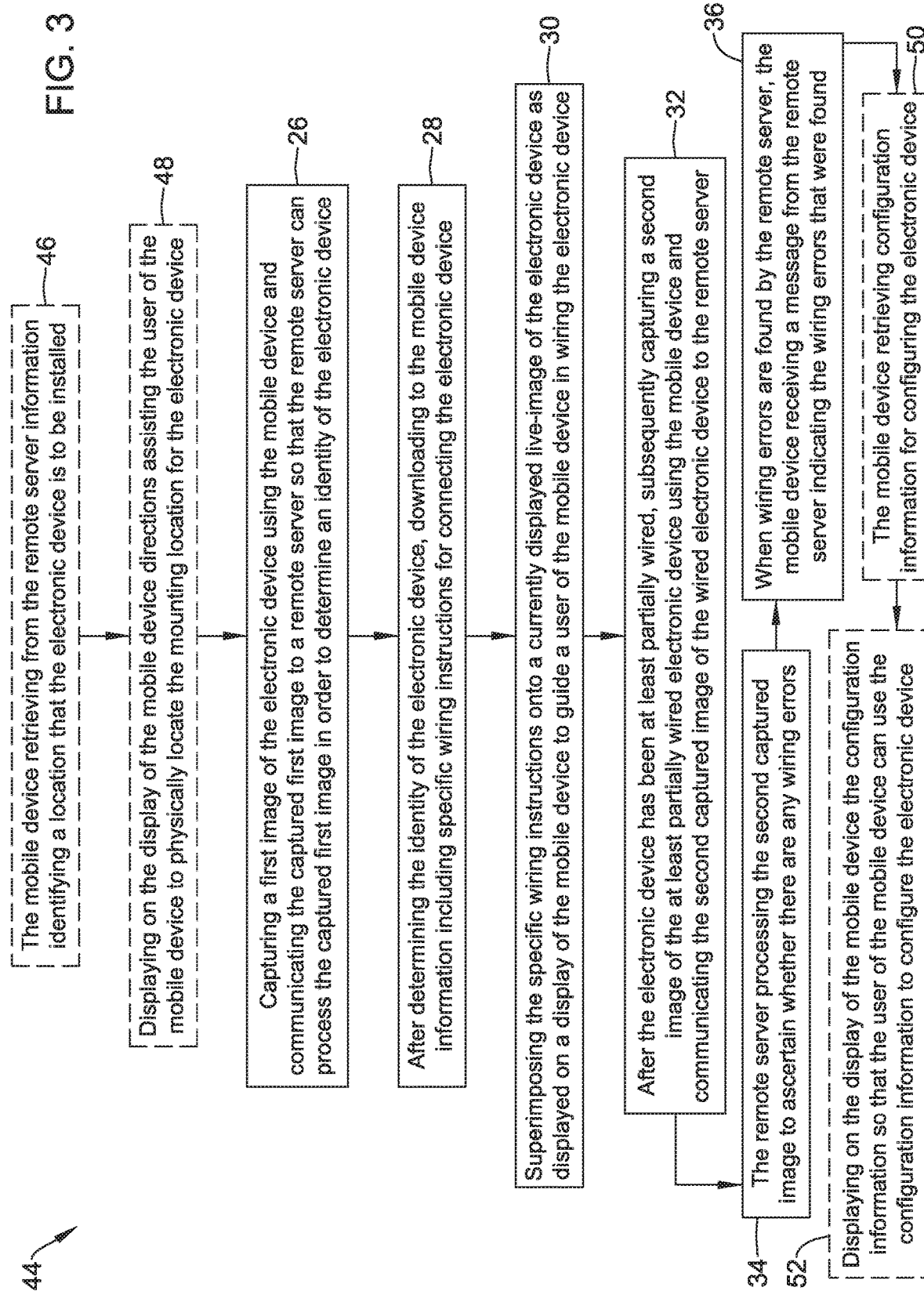
FIG. 3 is a flow diagram showing an illustrative method that may be carried out using the illustrative system of FIG. 1.

FIG. 3 is a flow diagram showing an illustrative method 44 of using a mobile device (such as the mobile device 14) to assist in installing and connecting an electronic device, where the electronic device is mountable to a structure and includes one or more wiring terminals connectable to one or more different wires. In some instances, the method 44 optionally includes retrieving from the remote server 12 information identifying a location that the electronic device is to be installed, as indicated at block 46. Directions that assist the user of the mobile device 14 in physically locating the mounting location of the electronic device may be displayed on the display 22 of the mobile device 14. Once the user is at the appropriate location, the user may capture a first image of the electronic device using the camera 20 of the mobile device 14 and communicate the captured first image to a remote server (such as the remote server 12) so that the remote server 12 can process the captured first image in order to determine an identity of the electronic device, as indicated at block 26. It is contemplated that the first image may be a still image or a video stream. Identifying the electronic device may be as simple as reading a bar code, a QR code or other identifiable code such as an alphanumeric identifier provided on a sticker or label on the electronic device. After the remote server 12 determines the identity of the electronic device, the remote server 12 downloads to the mobile device 14 information that includes specific wiring instructions for connecting the particular electronic device in accordance with the BMS specification, as indicated at block 28.

The mobile device 14 superimposes the specific wiring instructions onto a currently displayed live-image of the electronic device as displayed on the display 22 of the mobile device 14 to guide a user of the mobile device in wiring the electronic device, as indicated at block 30. The currently displayed live-image of the electronic device may be the captured first image of the electronic device. In some instances, the currently displayed live-image of the electronic device may instead be a live image (e.g. live still image or live video stream) of the electronic device as being captured by the camera 20 of the mobile device 14.

After the electronic device has been at least partially wired, which may include only a single wire having been connected, a second image of the at least partially wired electronic device may be subsequently captured using the camera 20 of the mobile device 14 and may be communicated to the remote server 12, as indicated at block 32. In some cases, the second image may be captured after the electronic device has been completely wired. It is contemplated that the second image may be a still image or a video stream. The remote server 12 processes the second captured image to ascertain whether there are any wiring errors, as indicated at block 34. When wiring errors are found by the remote server 12, the mobile device 14 receives a message from the remote server 12 indicating the wiring errors that were found, as indicated at block 36. In some cases, the mobile device 14 may also receive from the remote server 12 information indicating how to correct the wiring errors. If there are no wiring errors found, the mobile device 14 may receive a message from the remote server 12 indicating that the electronic device is properly wired with no wiring errors. That way, the installer knows that the particular device is properly wired in accordance with the BMS specification and the installer can move on to the next device.

In some cases, the method 44 optionally includes the mobile device 14 retrieving configuration information for configuring the electronic device from the remote server 12, as indicated at block 50. The configuration information may be displayed on the display 22 of the mobile device 14 so that the user of the mobile device 14 can use the configuration information to configure the electronic device in accordance with the BMS specification.

Figure 4:
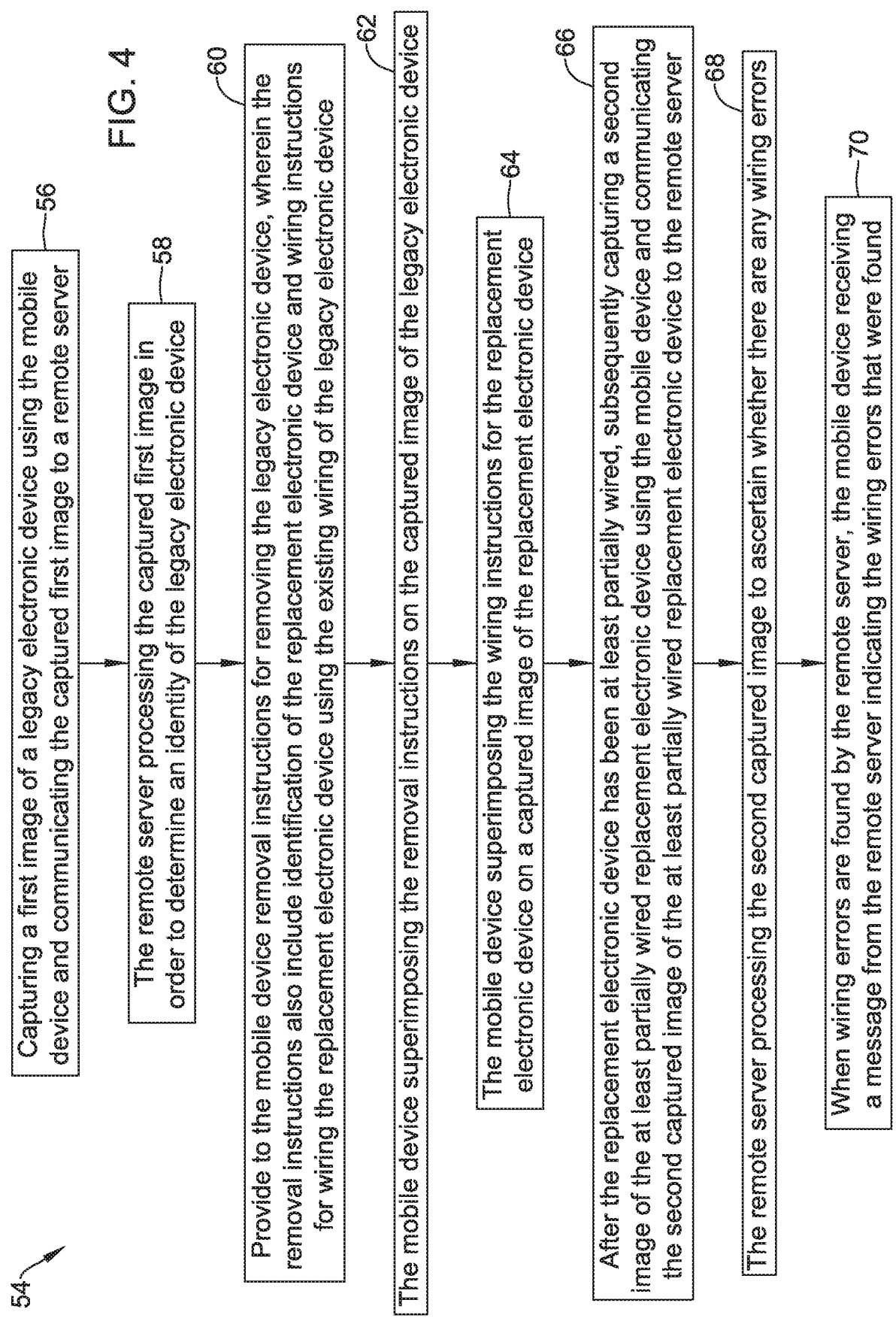
FIG. 4 is a flow diagram showing an illustrative method that may be carried out using the illustrative system of FIG. 1.

FIG. 4 is a flow diagram showing an illustrative method 54 of using a mobile device (such as the mobile device 14) to assist in replacing a legacy electronic device with a new electronic device. The method 54 includes capturing a first image of a legacy electronic device using the mobile device 14 and communicating the captured first image to the remote server 12, as indicated at block 56. The remote server 12 processes the captured first image in order to determine an identity of the legacy electronic device, as indicated at block 58. The remote server 12 may then provide to the mobile device 14 instructions for removing the legacy electronic device, instructions that identify a replacement electronic device, and/or wiring instructions for wiring the replacement electronic device using the existing wiring of the legacy electronic device, as indicated at block 60. In response, the mobile device 14 may superimpose removal instructions on the captured image of the legacy electronic device for removing the legacy electronic device, as indicated at block 62.

Next, the mobile device 14 may superimpose wiring instructions for the replacement electronic device on a captured image of the replacement electronic device as displayed on the display 22 of the mobile device 14, as indicated at block 64. After the replacement electronic device has been at least partially wired, a second image of the at least partially wired replacement electronic device may be captured using the mobile device 14 and may be communicated to the remote server 12, as indicated at block 66. The remote server 12 processes the second captured image to ascertain whether there are any wiring errors, as indicated at block 68. When wiring errors are found by the remote server 12, the mobile device 14 receives a message from the remote server 12 indicating the wiring errors that were found, as indicated at block 70.

Figure 5:
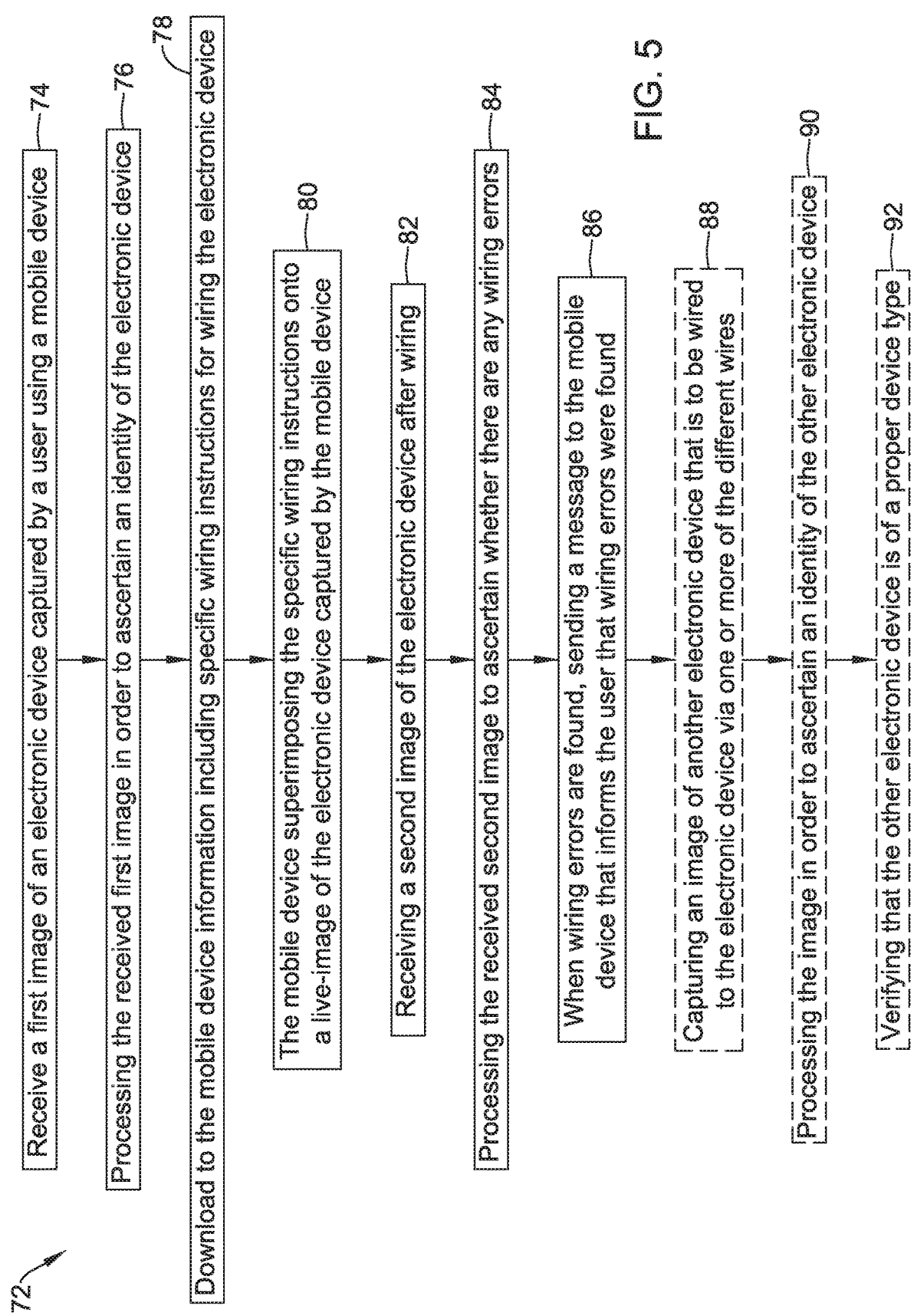
FIG. 5 is a flow diagram showing an illustrative method that may be carried out using the illustrative system of FIG. 1.

FIG. 5 is a flow diagram showing an illustrative method 72 that may be carried out by one or more processors of a server (such as the remote server 12) executing executable instructions that may be stored on a non-transient, computer-readable medium. When the executable instructions are executed by one or more processors of the server, the server ay receive a first image of an electronic device captured by a user using a mobile device such as the mobile device 14, as indicated at block 74. The received first image is processed in order to ascertain an identity of the electronic device, as indicated at block 76. In some cases, processing the received first image includes discerning a unique identifier that is included within the received first image. The unique identifier may, for example, include a bar code or a QR code displayed on the electronic device or an alphanumeric identifier on the electronic device.

Information including specific wiring instructions for wiring the electronic device is downloaded to the mobile device 14, as indicated at block 78. The mobile device 14 may superimpose the specific wiring instructions onto a live-image of the electronic device captured by the mobile device 14 as indicated at block 80. A second image of the electronic device may be received after wiring, as indicated at block 82, and may be processed to ascertain whether there are any wiring errors, as indicated at block 84. When wiring errors are found, a message is sent to the mobile device 14 that informs the user that wiring errors were found, as indicated at block 86. In some cases, when wiring errors are not found, a message may be sent to the mobile device 14 indicating that the electronic device is properly wired with no wiring errors.

Optionally, and as indicated at block 88, the method 72 may further include capturing an image of another electronic device that is to be wired to the electronic device via one or more of the different wires. The image may be processed in order to ascertain an identity of the other electronic device, as indicated at block 90, and thus verifying that the other electronic device is of a proper device type, as indicated at block 92.

Figure 6:
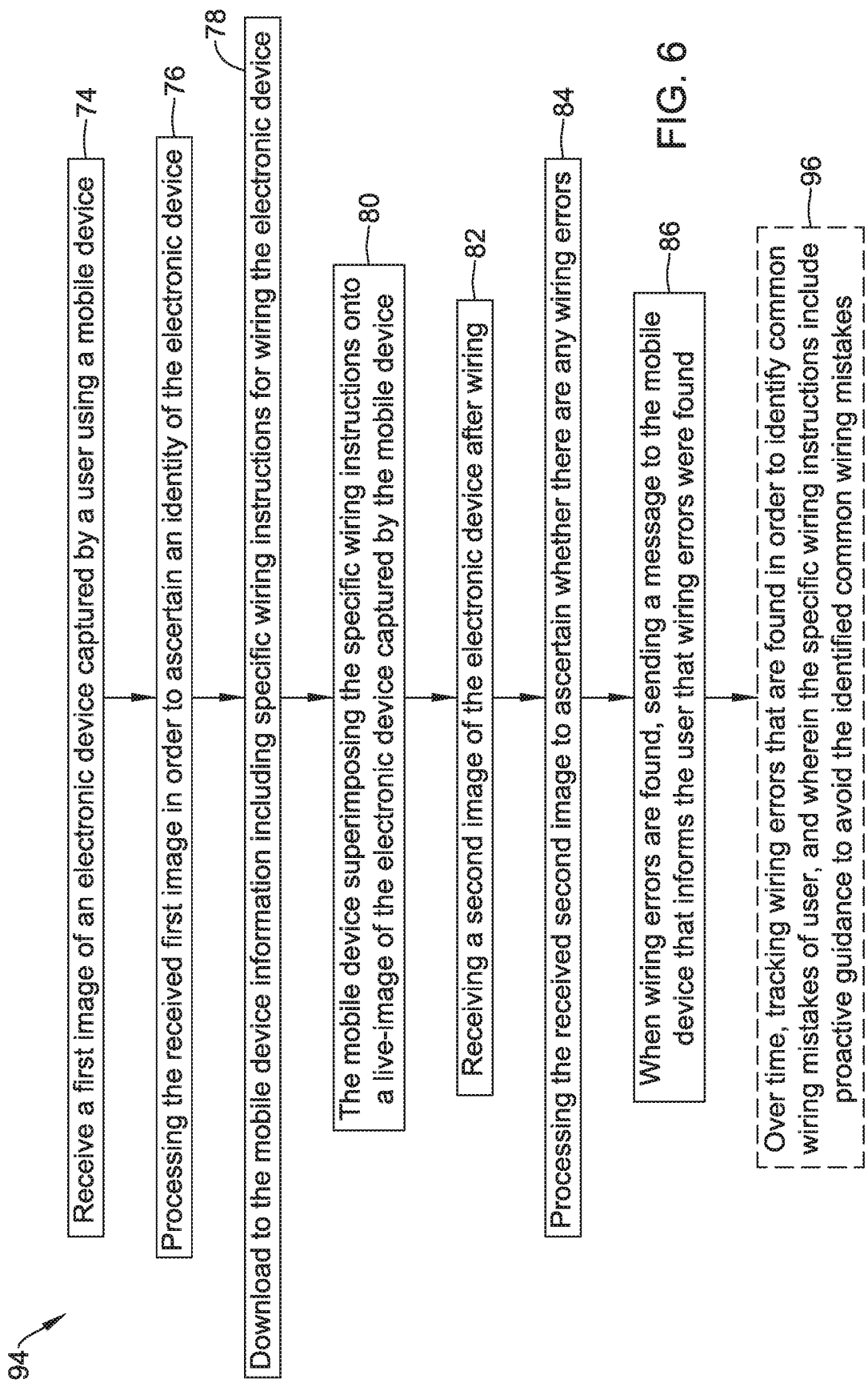
FIG. 6 is a flow diagram showing an illustrative method that may be carried out using the illustrative system of FIG. 1.

FIG. 6 is a flow diagram showing an illustrative method 94 that may be carried out by one or more processors of a server (such as the remote server 12) executing executable instructions that may be stored on a non-transient, computer-readable medium. When the executable instructions are executed by one or more processors of the server, the server receives a first image of an electronic device captured by a user using a mobile device such as the mobile device 14, as indicated at block 74. The received first image is processed in order to ascertain an identity of the electronic device, as indicated at block 76. In some cases, processing the received first image includes discerning a unique identifier that is included within the received first image. The unique identifier may, for example, include a bar code or a QR code displayed on the electronic device or an alphanumeric identifier on the electronic device.

Information including specific wiring instructions for wiring the electronic device is downloaded to the mobile device 14, as indicated at block 78. The mobile device 14 superimposes the specific wiring instructions onto a live-image of the electronic device captured by the mobile device 14 as indicated at block 80. A second image of the electronic device may be received after wiring, as indicated at block 82, and may be processed to ascertain whether there are any wiring errors, as indicated at block 84. When wiring errors are found, a message is sent to the mobile device 14 that informs the user that wiring errors were found, as indicated at block 86. In some cases, when wiring errors are not found, a message may be sent to the mobile device 14 indicating that the electronic device is properly wired with no wiring errors. In some instances, as optionally shown at block 96, wiring errors that are found may be tracked over time in order to identify common wiring mistakes of users, and wherein the specific wiring instructions include proactive guidance to avoid the identified common wiring mistakes.

Figure 7:
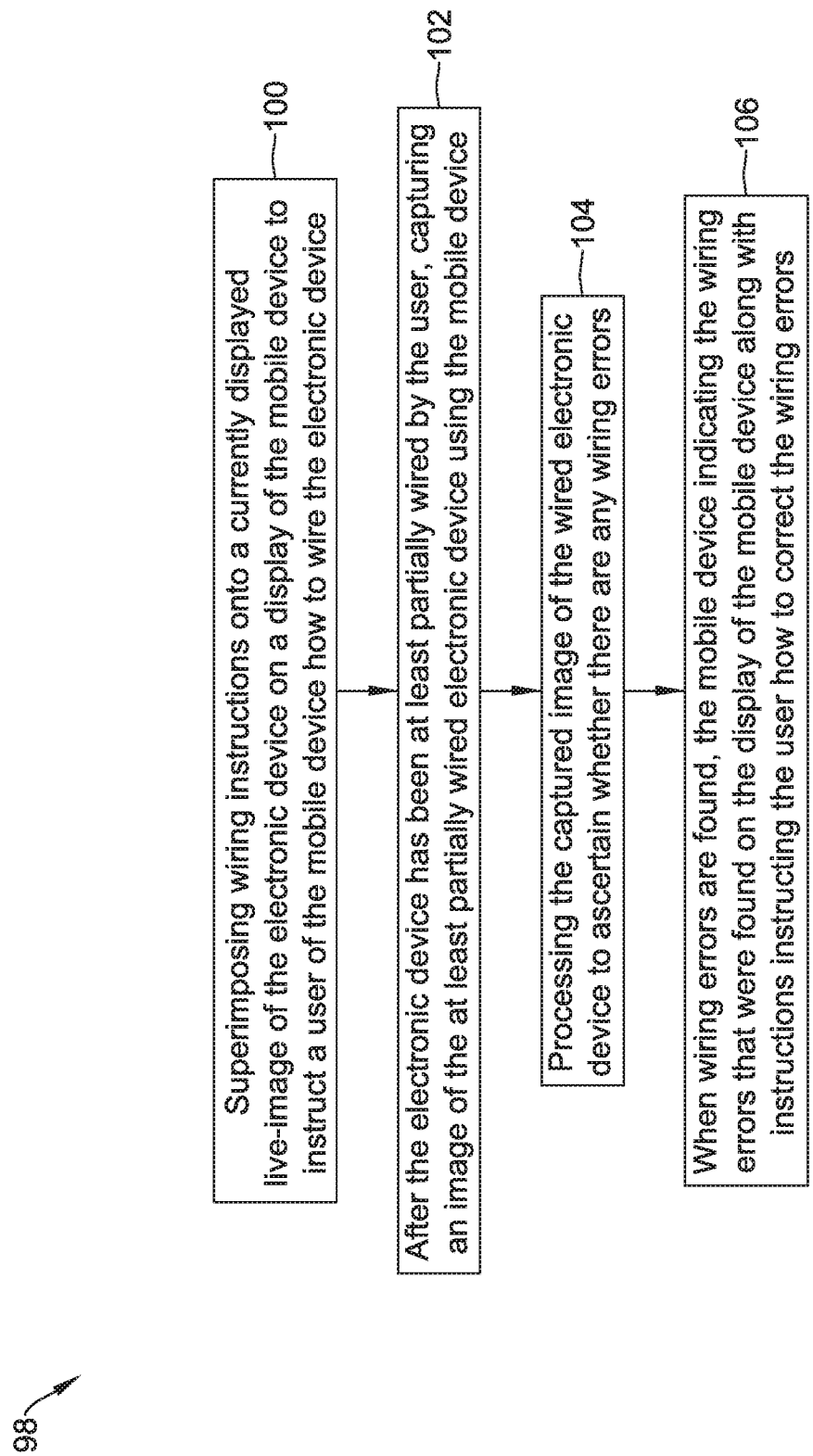
FIG. 7 is a flow diagram showing an illustrative method that may be carried out using the illustrative system of FIG. 1.

FIG. 7 is a flow diagram showing an illustrative method 98 of using a mobile device to assist in installing and connecting an electronic device in a Building Management System (BMS), the electronic device including one or more wiring terminals connectable to one or more different wires. The wiring instructions are superimposed onto a currently displayed live-image of the electronic device on a display of the mobile device to instruct a user of the mobile device how to wire the electronic device, as indicated at block 100. After the electronic device has been at least partially wired by the user, capturing an image of the at least partially wired electronic device is captured using the mobile device, as indicated at block 102. The captured image of the wired electronic device is processed to ascertain whether there are any wiring errors, as indicated at block 104. When wiring errors are found, the mobile device 14 indicates the wiring errors that were found on the display 22 of the mobile device 14 along with instructions instructing the user how to correct the wiring errors, as indicated by block 106.

Figure 8:
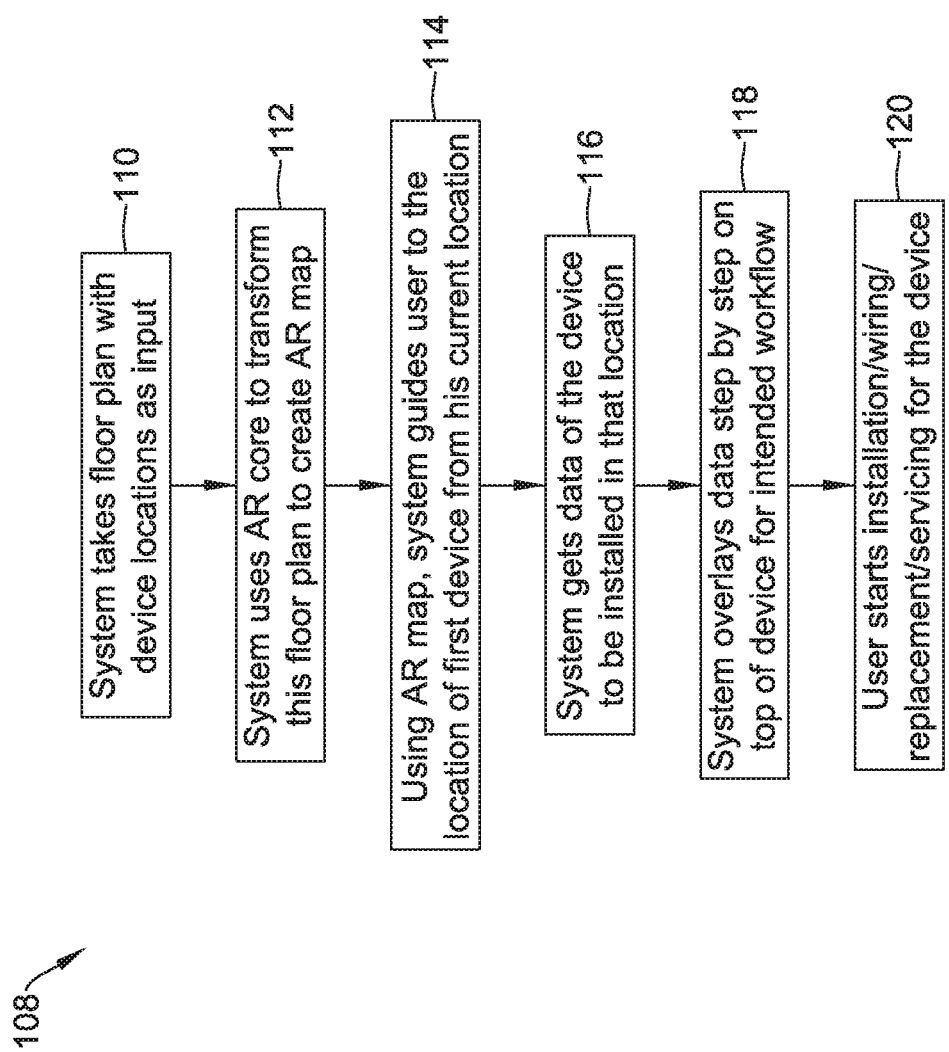
FIG. 8 is a flow diagram showing an illustrative method that may be carried out using the illustrative system of FIG. 1.

FIG. 8 is a flow diagram showing an illustrative method 108 that may be carried out via the illustrative system 10 of FIG. 1. The system 10 takes a floor plan including device locations as an input, as indicated at block 110. It will be appreciated that the engineering tool 16 may be used to input the floor plan. The system 10 then transforms the floor plan into an Augmented Reality (AR) map, as indicated at block 112. This may occur at the remote server 12, for example. The system 10 may then use the AR map to guide the user to the location of a particular device, such as the first device to be installed, from a current location of the user, as indicated at block 114. Guiding the user may include transmitting a map or other directions from the remote server 12 to the mobile device 14. The mobile device 14 may display a map or other directions that help the user find the location of the particular device. In some cases, for example, the mobile device 14 may provide audible instructions (i.e., "turn left at the next hallway" and so on).

As indicated at block 116, the system 10 receives installation data for that particular use, such as from the remote server 12. The installation data may include step-by-step instructions for which wire should be connected to which terminal of an electric device. The installation data may include configuration settings information as well, for example. The system 10 may overlay the installation data step-by-step on an image of the particular device, as indicated at block 118 (e.g. in an Augmented Reality Mode). In response, the user starts installing and/or wiring and/or replacing and/or servicing the particular device as indicated by the displayed instructions.

Figure 9:
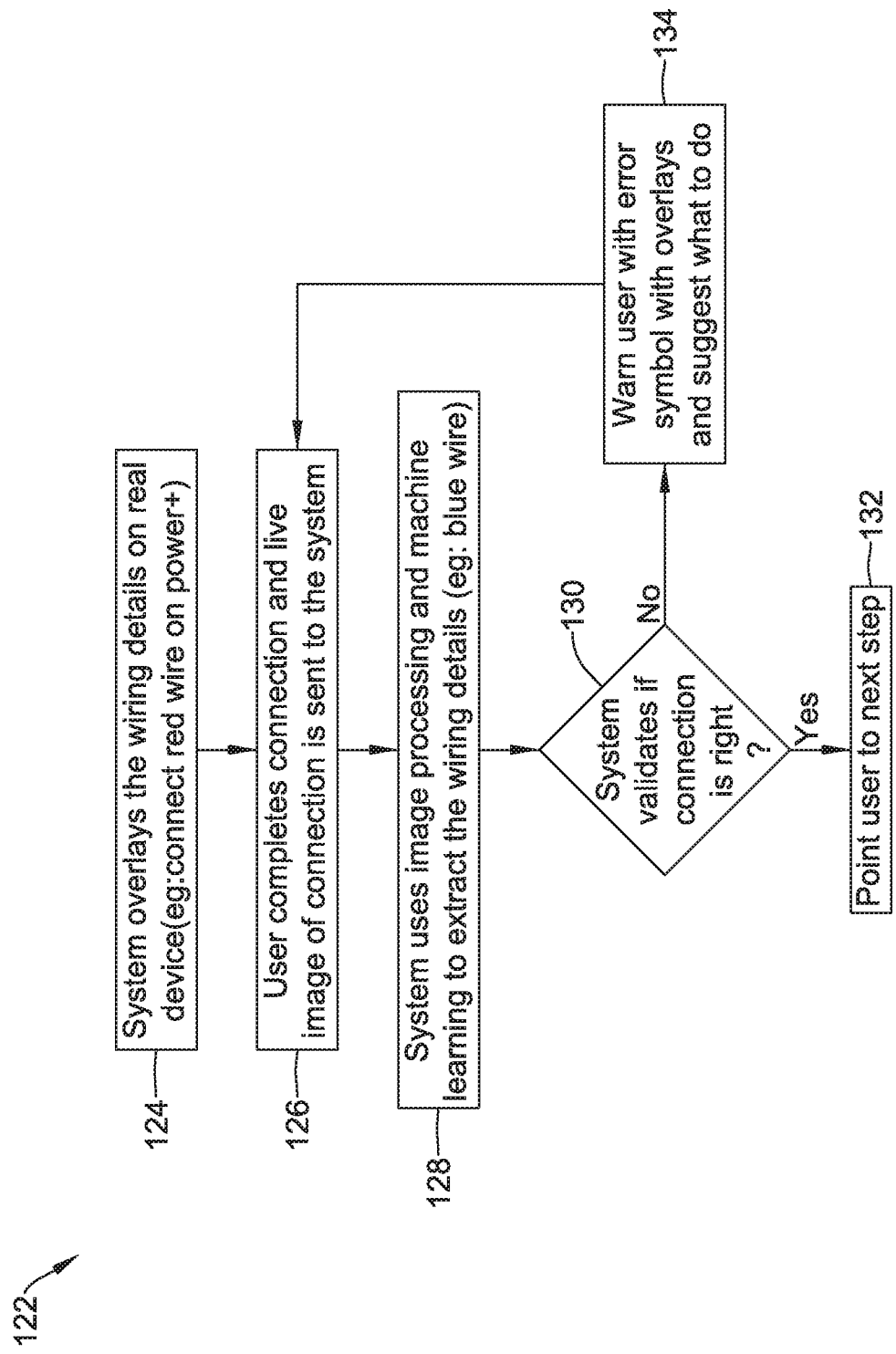
FIG. 9 is a flow diagram showing an illustrative method that may be carried out using the illustrative system of FIG. 1.

FIG. 9 is a flow diagram showing an illustrative method 122 that may be carried out via the illustrative system 10 of FIG. 1. In some cases, the illustrative method 122 may be considered as being an expanded example of the block 120 as shown in FIG. 8. The system 10 overlays wiring details over an image of the actual device, as indicated at block 124. This may, for example, include superimposing images or text over the displayed image on the mobile device 14, sometimes in an Augmented Reality Mode. The user completes the connection as instructed, and a live image of the connection may be sent to the system 10, as indicated at block 126. This may entail sending the live image of the connection to the remote server 12. The system 10 (and hence the remote server 12) may use image processing and/or machine learning in order to extract the wiring details, as indicated at block 128. The system 10 may ascertain, for example, the color of a particular wire and then determine if the correct color wire has been attached to a particular terminal. At decision block 130, a determination is made as to whether the connection is correct. If so, control passes to block 132 where the user is guided to making the next connection. Alternatively, control passes to block 134 where the user is warned that an error has been made, and the user is instructed to how to correct the problem.

Figure 10:
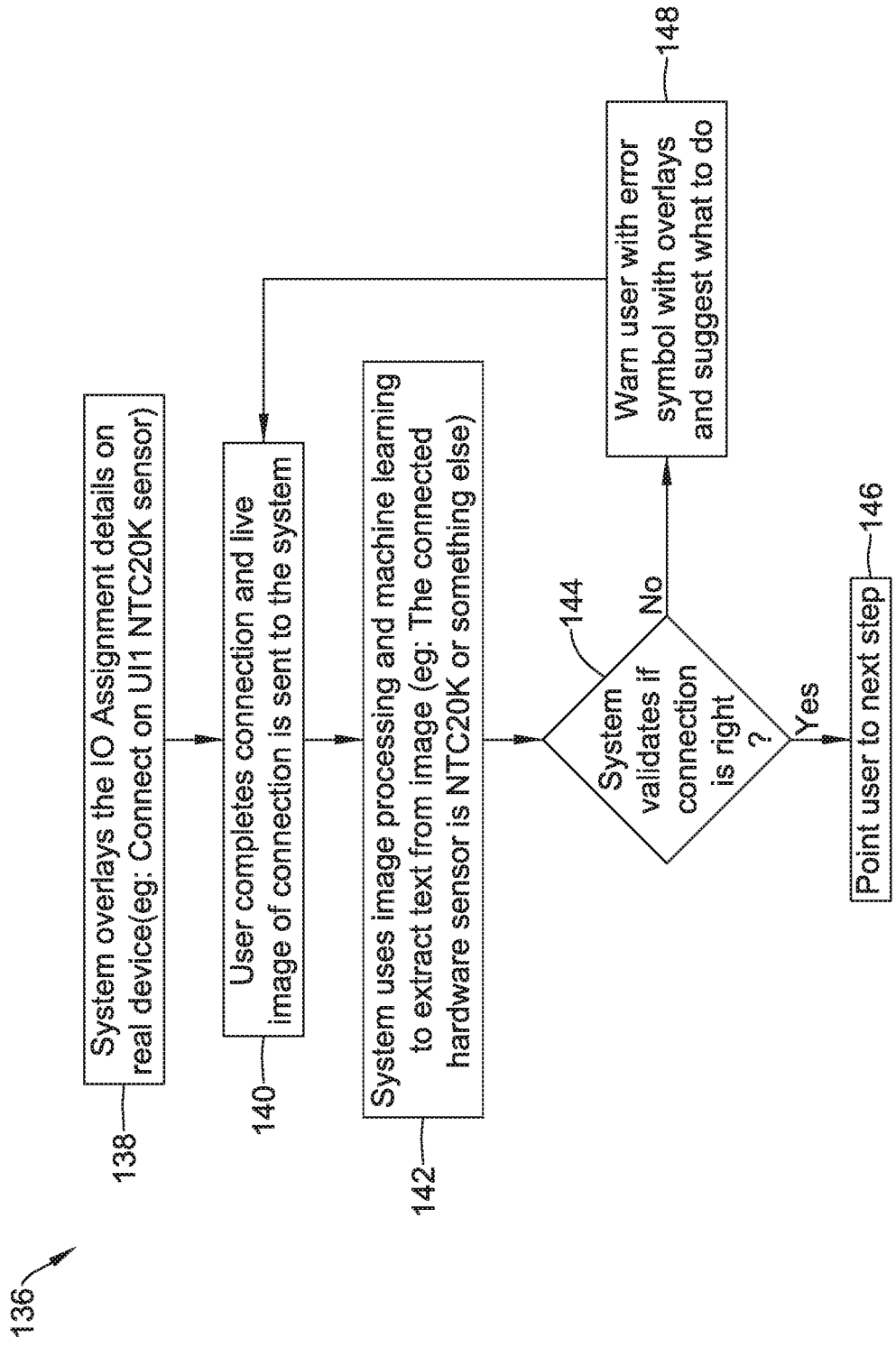
FIG. 10 is a flow diagram showing an illustrative method that may be carried out using the illustrative system of FIG. 1.

FIG. 10 is a flow diagram showing an illustrative method 136 that may be carried out via the illustrative system 10 of FIG. 1. The system 10 overlays configuration data such as but not limited to Input/Output assignment details over an image of the actual device, as indicated at block 138. As an example (as shown), the assignment detail may be "Connect a UI1 NTC20K (sensor)". This may, for example, include superimposing images or text over the displayed image on the mobile device 14, sometimes in an Augmented Reality Mode. The user completes the connection as instructed, and a live image of the connection may be sent to the system 10, as indicated at block 140. This may entail sending the live image of the connection to the remote server 12. The system 10 (and hence the remote server 12) may use image processing and/or machine learning in order to extract text from the image, as indicated at block 142. An example may be "The connected hardware sensor is NTC20K or something else". At decision block 144, the system 10 determines whether the connection is correct. If so, control passes to block 146 where the user is guided to making the next connection. Alternatively, control passes to block 148 where the user is warned that an error has been made, and the user is instructed to how to correct the problem.

Figure 11:
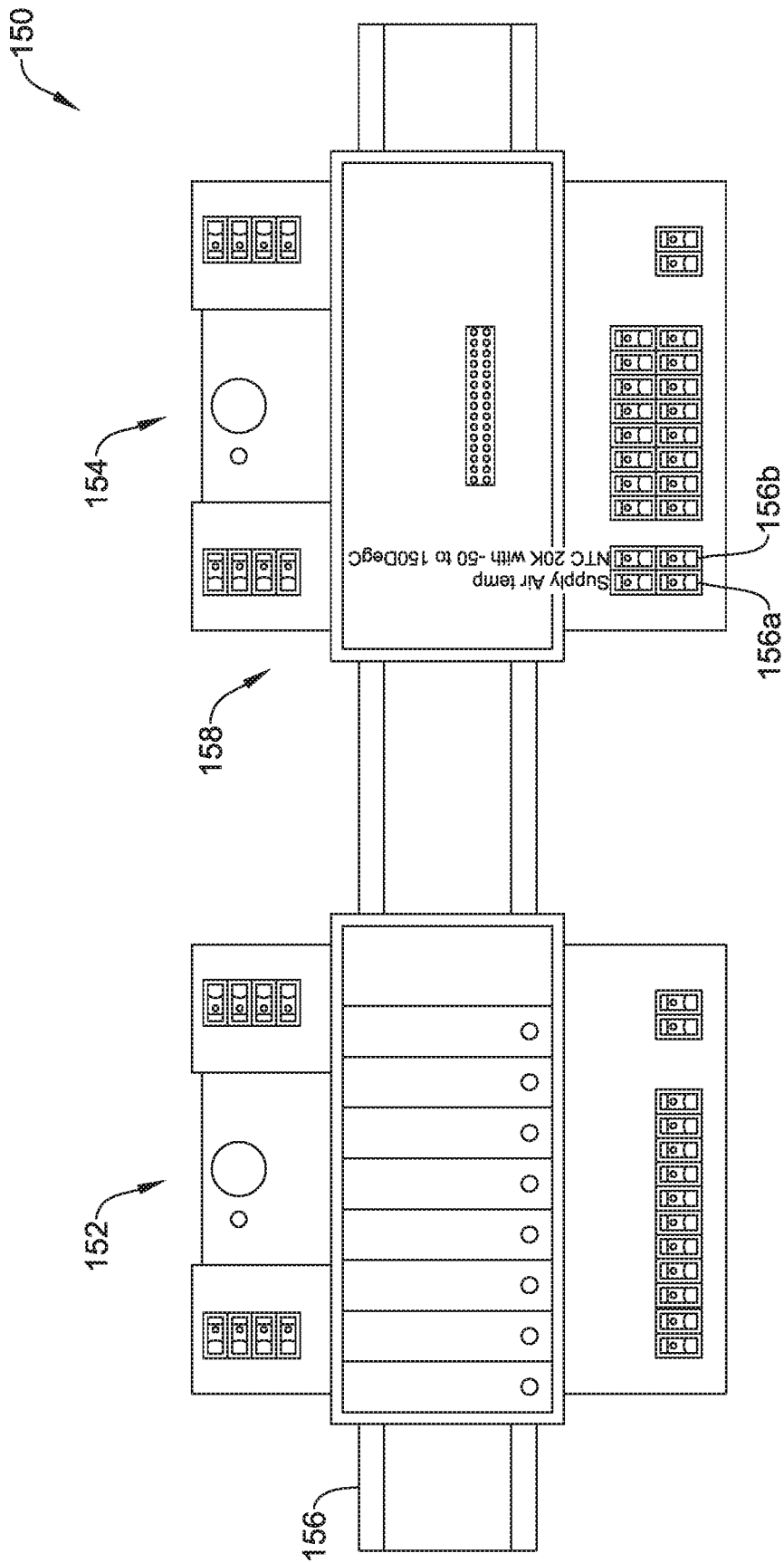
FIG. 11 is an illustrative screen capture from a display of a mobile device being used to assist in installing and connecting an electronic device.

FIG. 11 is a screen shot showing an illustrative screen 150 that may be displayed by the mobile device 14. The screen shot 150 includes a first electronic device 152 and a second electronic device 154 shown mounted on a DIN rail 156. The screen shot 150 may represent an image captured by the mobile device 14. The second electronic device 154 includes a pair of terminals 156a and 156b. Additional information 158 can be seen as being superimposed on the screen 150, providing augmented information about the sensor model to connect to each pin/port. The additional information 158 can be seen to indicate that the particular sensor to be connected to the terminals 156a and 156b is a supply air temperature, model NTC 20K with a working temperature range of −50 to 150 degrees Celsius.

Figure 12:
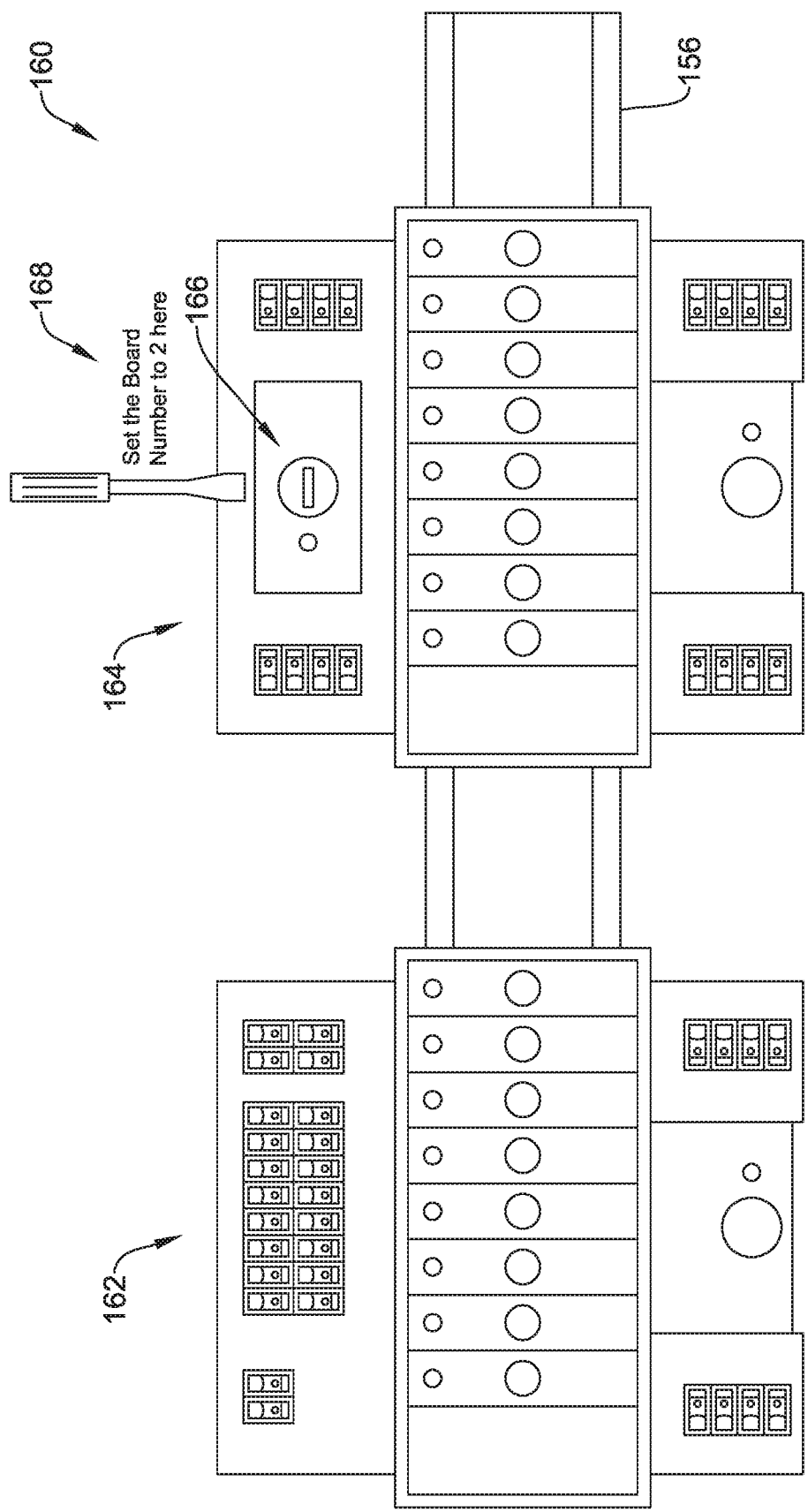
FIG. 12 is an illustrative screen capture from a display of a mobile device being used to assist in installing and connecting an electronic device.

FIG. 12 is a screen shot showing an illustrative screen 160 that may be displayed by the mobile device 14. The screen shot 160 includes a first electronic device 162 and a second electronic device 164 shown mounted on a DIN rail 156. The screen shot 160 may represent an image captured by the mobile device 14. The second electronic device 164 includes an adjustable setting 166 indicating a board number. Additional information 168 can be seen as being superimposed on the screen 160, providing augmented information about how to set the adjustable setting 166. As shown, the additional information 168 can be seen to indicate that the adjustable setting 166 (board number) should be set to a value of 2 in order to be in accordance with the BMS specification.

Figure 13:
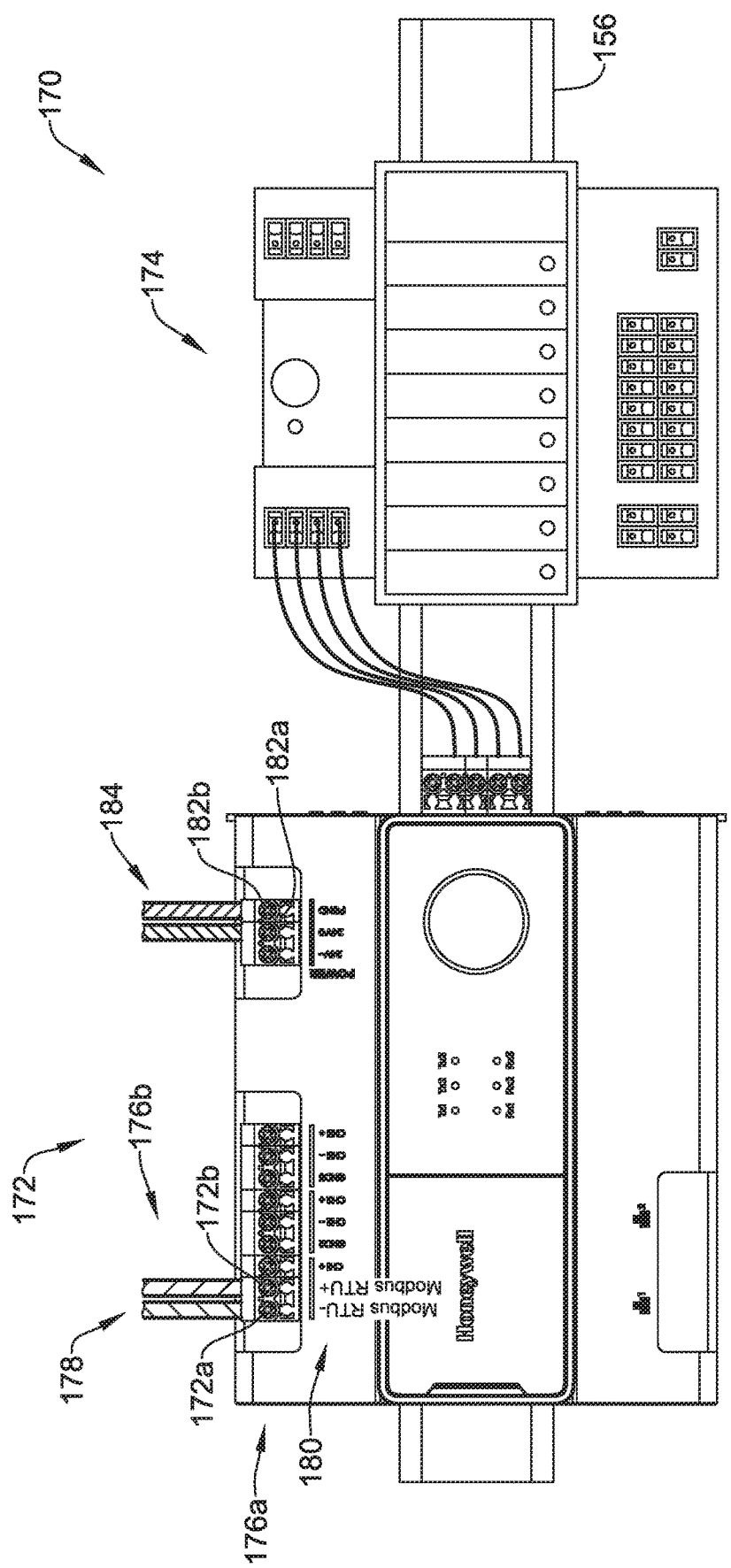
FIG. 13 is an illustrative screen capture from a display of a mobile device being used to assist in installing and connecting an electronic device.

FIG. 13 is a screen shot showing an illustrative screen 170 that may be displayed by the mobile device 14. The screen 170 includes a first electronic device 172 and a second electronic device 174 shown mounted on a DIN rail 156. The screen shot 170 may represent an image captured by the mobile device 14. The first electronic device 172, which may for example represent a controller, includes a first pair of terminals 176a and 176b. Additional information 178 provides an image of which wires should be connected to teach of the terminals 176a and 176b. As illustrated, the terminal 176a is the negative terminal and the terminal 176b is the positive terminal. In some cases, the additional information 178 may show the actual colors of the wires (say, yellow for negative and white for positive), but in some cases the additional information 178 may be provided in gray scale.

The screen 170 also includes additional information 180 superimposed on the image, which informs the user that the terminal 176a is the Modbus RTU– terminal and the terminal 176b is the Modbus RTU+ terminal. The first electronic device 172 also includes a second pair of terminals 182a and 182b that may be considered as power terminals. Additional information 184 includes a graphical indication of which power cable to connect to which of the terminals 182a, 182b. In some cases, the additional information 182 may show the actual colors (say, a black wire for the positive power supply and a red wire for the negative power supply), but in some cases the additional information 182 may be provided in gray scale.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of using a mobile device to assist in installing and connecting an electronic device, the electronic device mountable to a structure and including one or more wiring terminals connectable to one or more different wires, the electronic device includes a replacement electronic device for replacing a legacy electronic device, the method comprising:
   capturing an image of the legacy electronic device using the mobile device and communicating the captured image of the legacy electronic device to a remote server;
   processing the captured image of the legacy electronic device via the remote server to identify the legacy electronic device;
   provide to the mobile device removal instructions for removing the legacy electronic device, wherein the removal instructions include an identification of the replacement electronic device, wherein the mobile device superimposes the removal instructions on the captured image of the legacy electronic device;
   after the legacy electronic device has been removed, capturing a first image of the replacement electronic device using the mobile device and communicating the captured first image to the remote server so that the remote server can process the captured first image in order to determine an identity of the replacement electronic device;
   after determining the identity of the replacement electronic device, downloading to the mobile device information including wiring instructions for wiring the replacement electronic device using the existing wiring of the legacy electronic device;
   superimposing the wiring instructions onto a currently displayed live-image of the replacement electronic device as displayed on a display of the mobile device to guide a user of the mobile device in wiring the replacement electronic device;
   after the replacement electronic device has been at least partially wired, subsequently capturing a second image of the at least partially wired replacement electronic device using the mobile device and communicating the second captured image of the wired replacement electronic device to the remote server;
   the remote server processing the second captured image to ascertain whether there are any wiring errors; and
   when wiring errors are found by the remote server, the mobile device receiving a message from the remote server indicating the wiring errors that were found.

2. The method of claim 1, wherein the currently displayed live-image of the replacement electronic device comprises the captured first image of the electronic device.

3. The method of claim 1, wherein the currently displayed live-image of the replacement electronic device comprises a live image of the replacement electronic device as captured by a camera of the mobile device.

4. The method of claim 1, wherein the second image is captured after the replacement electronic device has been completely wired.

5. The method of claim 4, wherein when wiring errors were not found by the remote server after the replacement electronic device has been completely wired, the mobile device receives a message from the remote server indicating that the replacement electronic device is properly wired with no wiring errors.

6. The method of claim 1, wherein the remote server processes the captured first image in order to determine an identity of the replacement electronic device by discerning a unique identifier included within the captured first image.

7. The method of claim 6, wherein the unique identifier comprises a bar code, a QR code, and/or an alphanumeric identifier on the replacement electronic device.

8. The method of claim 1, further comprising:
   capturing an image of another electronic device that is to be wired to the replacement electronic device via one or more of the different wires;
   processing the image in order to ascertain an identity of the other electronic device; and
   verifying that the other electronic device is of a device type that can be connected to the replacement electronic device.

9. The method of claim 1, wherein the remote server is configured to use machine learning to identify common wiring mistakes of users, and the wiring instructions provided by the remote server include proactive guidance to avoid the identified common wiring mistakes.

10. The method of claim 1, further comprising:
    prior to being located at a mounting location for the replacement electronic device, the mobile device retrieving from the remote server information identifying a location that the replacement electronic device is to be installed; and
    displaying on the display of the mobile device directions assisting the user of the mobile device to physically locate the mounting location for the replacement electronic device.

11. The method of claim 1, further comprising:
    the mobile device retrieving configuration information for configuring one or more calibration and/or setting parameters of the replacement electronic device; and
    displaying on the display of the mobile device the configuration information so that the user of the mobile device can use the configuration information to properly configure one or more of the calibration and/or setting parameters of the replacement electronic device.

12. The method of claim 1, wherein the replacement electronic device comprises a building controller.

13. A non-transitory, computer-readable medium having thereon executable instructions for instructing a user how to wire an electronic device, the executable instructions when executed by one or more processors of a server cause the server to:
  send to a mobile device for display information identifying a location that the electronic device is to be installed to assist a user of the mobile device in physically locating the mounting location for the electronic device;
  receive a first image of the electronic device captured by a user using the mobile device;
  process the received first image in order to ascertain an identity of the electronic device;
  download to the mobile device information including wiring instructions for wiring the electronic device;
  receive a second image of the electronic device after wiring;
  process the received second image to ascertain whether there are any wiring errors; and
  when wiring errors are found, send a message to the mobile device that informs the user that wiring errors were found.

14. The non-transitory, computer-readable medium of claim 13, wherein when wiring errors are not found by the server, send a message to the mobile device indicating that the electronic device is properly wired with no wiring errors.

15. The non-transitory, computer-readable medium of claim 13, wherein processing the received first image comprises discerning a unique identifier included within the received first image.

16. The non-transitory, computer-readable medium of claim 15, wherein the unique identifier comprises a bar code, a QR code displayed on the electronic device, and/or an alphanumeric identifier on the electronic device.

17. The non-transitory, computer-readable medium of claim 13, wherein the executable instructions when executed by the one or more processors of the server cause the server to:
  capture an image of another electronic device that is to be wired to the electronic device via one or more of the different wires;
  process the image in order to ascertain an identity of the other electronic device; and
  verify that the other electronic device is of a device type that can properly be connected to the electronic device.

18. The non-transitory, computer-readable medium of claim 13, wherein the executable instructions when executed by the one or more processors of the server cause the server to, over time, track wiring errors that are found in order to identify common wiring mistakes of users, and wherein the wiring instructions include proactive guidance to avoid the identified common wiring mistakes.

19. A method of using a mobile device to assist in installing and connecting an electronic device in a Building Management System (BMS), the electronic device including one or more wiring terminals connectable to one or more different wires, the method comprising:
  superimposing wiring instructions onto a currently displayed live-image of the electronic device on a display of the mobile device to instruct a user of the mobile device how to wire the electronic device;
  after the electronic device has been at least partially wired by the user, capturing an image of the at least partially wired electronic device using the mobile device;
  processing the captured image of the wired electronic device to ascertain whether there are any wiring errors;
  when wiring errors are found, the mobile device indicating the wiring errors that were found on the display of the mobile device along with instructions instructing the user how to correct the wiring errors;
  the mobile device retrieving configuration information for configuring one or more calibration and/or setting parameters of the electronic device; and
  displaying on the display of the mobile device the configuration information so that the user of the mobile device can use the configuration information to properly configure one or more of the calibration and/or setting parameters of the electronic device.

* * * * *